US011932267B2

(12) United States Patent
Ando

(10) Patent No.: US 11,932,267 B2
(45) Date of Patent: Mar. 19, 2024

(54) VEHICLE SYSTEM

(71) Applicant: TOYOTA JIDOSHA KABUSHIKI KAISHA, Toyota (JP)

(72) Inventor: Eisuke Ando, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 378 days.

(21) Appl. No.: 16/820,114

(22) Filed: Mar. 16, 2020

(65) Prior Publication Data
US 2020/0339141 A1 Oct. 29, 2020

(30) Foreign Application Priority Data
Apr. 26, 2019 (JP) ................................. 2019-085137

(51) Int. Cl.
*B60W 50/029* (2012.01)
*B60R 16/03* (2006.01)

(52) U.S. Cl.
CPC ........... *B60W 50/029* (2013.01); *B60R 16/03* (2013.01); *B60W 2050/0292* (2013.01)

(58) Field of Classification Search
CPC .. B60W 50/02; B60W 50/023; B60W 50/029; B60W 2050/0292; B60L 3/0092; G05D 1/0061; G05D 1/0077; G05D 1/0088; G05D 1/021; G05D 1/0214; G05D 1/0223
See application file for complete search history.

(56) References Cited

U.S. PATENT DOCUMENTS

| 2006/0015231 | A1* | 1/2006 | Yoshimura | ............ B60L 3/0076 701/1 |
| 2008/0288150 | A1* | 11/2008 | Isogai | ...................... B60T 7/22 701/70 |
| 2017/0244594 | A1* | 8/2017 | Shiota | ................. H04W 12/122 |
| 2018/0029474 | A1* | 2/2018 | Berels | ..................... B60L 3/003 |

(Continued)

FOREIGN PATENT DOCUMENTS

| JP | 08036551 A | * | 2/1996 |
| JP | H08-036551 A | | 2/1996 |

(Continued)

OTHER PUBLICATIONS

JP-08036551-A—english translation (Year: 2008).*

*Primary Examiner* — Abby Y Lin
*Assistant Examiner* — Renee LaRose
(74) *Attorney, Agent, or Firm* — Oliff PLC

(57) ABSTRACT

A vehicle system includes: a vehicle platform including a first computer that controls traveling of a vehicle; an automated-driving platform including a second computer that controls automated-driving of the vehicle; a first network connecting the vehicle platform and the automated-driving platform; a second network connecting the vehicle platform and the automated-driving platform; a main power supply that supplies electricity required for communication in the first network; a sub-power supply that supplies electricity required for communication in the second network; and a communication interface that allows communication between the vehicle platform and the automated-driving platform to be performed by using any one of the first network and the second network.

7 Claims, 5 Drawing Sheets

(56) References Cited

U.S. PATENT DOCUMENTS

2019/0097932 A1* 3/2019 Buczek .................. H04L 67/12
2019/0258251 A1* 8/2019 Ditty .................... B60W 50/023
2019/0359221 A1* 11/2019 Ochida ................ G05D 1/0088

FOREIGN PATENT DOCUMENTS

| JP | 2008-279983 A | 11/2008 |
| JP | 2017-152762 A | 8/2017 |
| JP | 2018-132015 A | 8/2018 |

* cited by examiner

| DATA NAME | TYPE |
|---|---|
| INSTRUCTION ABOUT ACCELERATION-DECELERATION | Input |
| INSTRUCTION ABOUT STEERING ANGLE | Input |
| CURRENT SPEED | Output |
| STATE OF STEERING ANGLE | Output |

VEHICLE SYSTEM

INCORPORATION BY REFERENCE

The disclosure of Japanese Patent Application No. 2019-085137 filed on Apr. 26, 2019 including the specification, drawings and abstract is incorporated herein by reference in its entirety.

BACKGROUND

1. Technical Field

The disclosure relates to a vehicle system.

2. Description of Related Art

Studies on automated-driving of a vehicle have been vigorously conducted. For example, Japanese Patent Application Publication No. 2018-132015 describes a vehicle system in which apart from an engine ECU, an automated-driving ECU including a function of sensing vehicle surroundings is provided in a vehicle, and the automated-driving ECU issues a command to the engine ECU through an in-vehicle network.

As in the disclosure described in JP 2018-132015 A, by configuring an ECU for automated-driving independently of an ECU that manages traveling of a vehicle, an automated-driving function can be added without making a great change to an existing vehicle platform. It can also be anticipated that development of automated-driving functions by third parties is promoted.

SUMMARY

When an abnormality or the like occurs in a power supply for supplying electricity to a network connecting an ECU for automated-driving and an ECU that controls traveling of a vehicle (for example, an engine ECU), the ECU for automated-driving and the ECU that controls traveling of the vehicle may become unable to communicate with each other, and consequently the vehicle may become unable to properly travel.

The disclosure has been made in light of such circumstances, and an object of the disclosure is to provide a highly reliable vehicle system.

A vehicle system according to the disclosure includes: a vehicle platform including a first computer that controls traveling of a vehicle; an automated-driving platform including a second computer that controls automated-driving of the vehicle; a first network connecting the vehicle platform and the automated-driving platform; a second network connecting the vehicle platform and the automated-driving platform; a main power supply that supplies electricity required for communication in the first network; a sub-power supply that supplies electricity required for communication in the second network; and a communication interface that allows communication between the vehicle platform and the automated-driving platform to be performed by using any one of the first network and the second network.

According to the disclosure, a highly reliable vehicle system can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
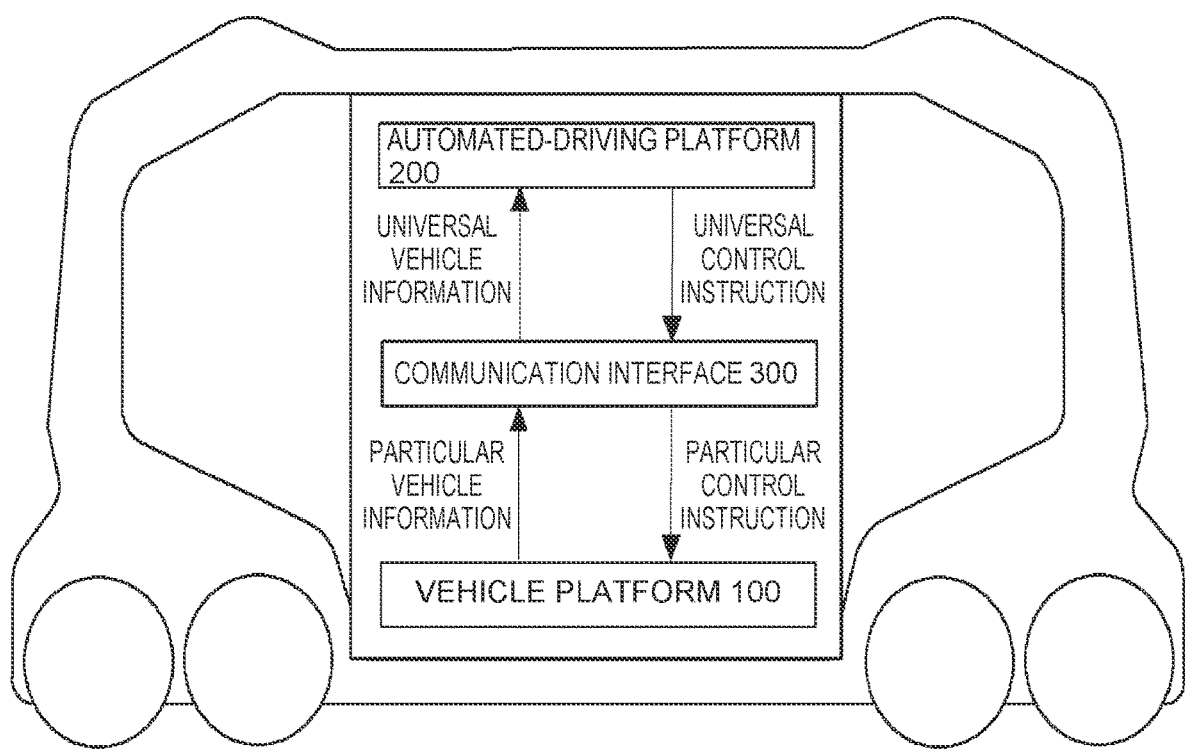
FIG. 1 is a diagram outlining a vehicle system according to an embodiment.

A conceivable configuration is that a vehicle platform including a computer that controls motive power of a vehicle and an automated-driving platform that performs automated-driving-related determination are configured independently of each other and mounted on a vehicle system individually. For example, the automated-driving platform performs sensing of vehicle surroundings and transmits a control instruction to the existing vehicle platform based on a result of the sensing. Since such a configuration enables independent vendors to develop a platform individually, development of automated-driving functions by third parties can be promoted.

Here, if a network connecting the vehicle platform and the automated-driving platform is a single system, the vehicle platform and the automated-driving platform may become unable to communicate with each other when an abnormality or the like occurs in a power supply of the network, and consequently it may become difficult to cause the vehicle to properly travel.

Accordingly, in a vehicle system according to an embodiment, the vehicle platform and the automated-driving platform are connected by using a dual network including a first network and a second network. In addition, a power supply (main power supply) that supplies electricity required for communication in the first network and a power supply (sub-power supply) that supplies electricity required for communication in the second network are configured by using mutually independent power supplies. In addition, a communication interface that allows communication between the vehicle platform and the automated-driving platform to be performed by using any one of the networks in the dual network is mounted on the vehicle system.

According to the vehicle system configured as described above, when an abnormality occurs in the power supply of any one of the networks in the dual network, communication between the vehicle platform and the automated-driving platform can be performed by using the other network. For example, when the main power supply is operating normally, the communication interface may allow communication between the vehicle platform and the automated-driving platform to be performed by using the first network. When an abnormality occurs in the main power supply, the communication interface may allow communication between the vehicle platform and the automated-driving platform to be performed by using the second network. According to such a configuration, even when the first network falls in an unusable state due to an abnormality in the main power supply, communication between the vehicle platform and the automated-driving platform can be secured by the second network that can operate based on the sub-power supply that is different from the main power supply. As a result, even when an abnormality occurs in the main power supply, it is possible to cause the vehicle to properly travel. Accordingly, the highly reliable vehicle system can be provided.

Incidentally, several problems arise when platforms developed by different vendors are made to coexist in a single vehicle system, that is, when a vehicle platform including a motive power system for a vehicle and an automated-driving platform including an automated-driving system that issues a control instruction to the motive power system are connected to a single in-vehicle network. One of the problems is that commands for controlling the vehicle platform are not unified and vary among manufacturers and vehicle types. For example, since inputs and outputs of engine ECUs differ among manufacturers and vehicle types, it is costly to configure an automated-driving ECU to support all vehicle types. Moreover, since various information for controlling a vehicle flows in an in-vehicle network, it is undesirable in terms of security to permit an automated-driving platform (manufactured by a third party that has no direct relationship with a vehicle platform) to access such information without limitation.

Accordingly, in the vehicle system according to the embodiment, the communication interface may be configured to relay information exchanged between the vehicle platform and the automated-driving platform. Here, a diagram outlining the vehicle system according to the embodiment is shown in FIG. 1. As shown in FIG. 1, a vehicle platform 100 is a platform including a first computer (for example, an engine ECU or the like) that controls traveling of a vehicle. An automated-driving platform 200 is a platform including a second computer (for example, an automated-driving ECU) that controls automated-driving of the vehicle. The automated-driving platform 200 may include means for performing sensing of vehicle surroundings and means for generating a traveling-related schedule based on a result of the sensing. A communication interface 300 may be configured to connect the vehicle platform 100 and the automated-driving platform 200 and to relay mutually input and output information. For example, the communication interface 300 acquires a first control instruction including data for controlling the vehicle platform from the second computer. Subsequently, the communication interface 300 translates the first control instruction into a second control instruction for the first computer. The communication interface 300 transmits the second control instruction to the first computer. By configuring the communication interface 300 to include such a function, versatility of the automated-driving platform 200 can be enhanced while security of the vehicle platform 100 is ensured.

Here, the first control instruction may be generated as a universal instruction that is not particular to the first computer included in the vehicle. The communication interface 300 may be configured to translate the first control instruction into the second control instruction that is data particular to the first computer. According to such a configuration, a universal instruction can be translated into an instruction that is particular to a vehicle type or a manufacturer.

Embodiment

An outline of the vehicle system according to the first embodiment will be described. As shown in FIG. 1, the vehicle system according to the embodiment includes the vehicle platform 100, the automated-driving platform 200, and the communication interface 300, and is configured such that components of the vehicle platform 100, the automated-driving platform 200, and the communication interface 300 are communicably connected through dual buses 400, 401 (main bus 400, sub-bus 401) that operate based on mutually independent power supplies 500, 501 (main power supply 500, sub-power supply 501), respectively.

The vehicle platform 100 is a vehicle platform of an existing type. The vehicle platform 100 operates based on a control instruction that is particular to the vehicle and generates vehicle information that is particular to the vehicle. The control instruction and the vehicle information are, for example, encapsulated in a CAN frame flowing in the in-vehicle network.

The automated-driving platform 200 includes means for sensing vehicle surroundings and issues a control instruction that is not particular to a vehicle type or a manufacturer. The automated-driving platform 200 acquires vehicle information that is not particular to a vehicle type or a manufacturer.

The communication interface 300 translates a control instruction that is not particular to the vehicle (that is, a control instruction generated by the automated-driving platform 200) into a control instruction that is particular to the vehicle (that is, a control instruction that can be interpreted by the vehicle platform 100), and vice versa. The communication interface 300 translates vehicle information that is particular to the vehicle (that is, vehicle information generated by the vehicle platform 100) into vehicle information that is not particular to the vehicle (that is, vehicle information that can be interpreted by the automated-driving platform 200), and vice versa. The communication interface 300 also includes a function of switching between communication using the main bus 400 and communication using the sub-bus 401.

System Configuration

Figure 2:
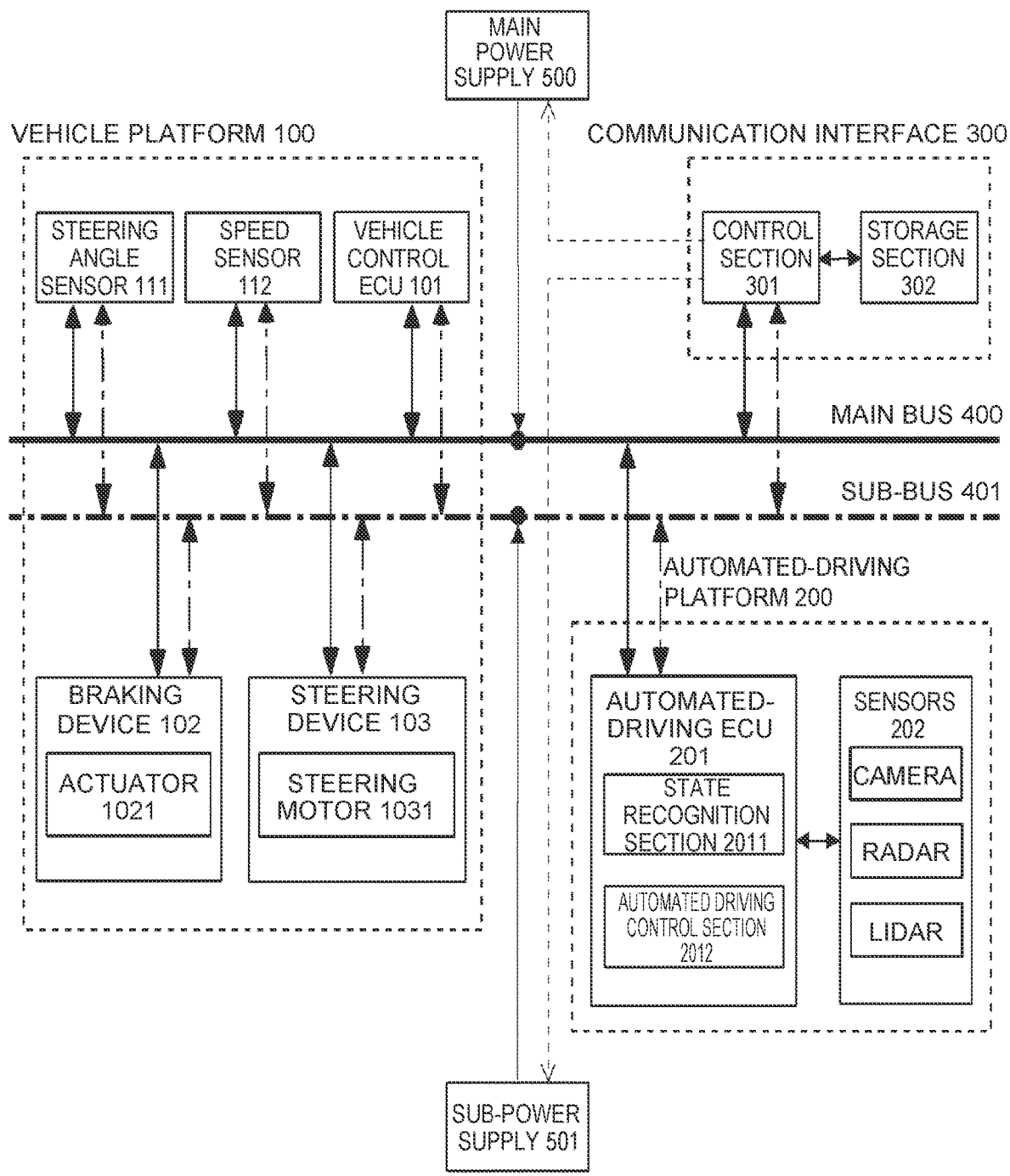
FIG. 2 is a block diagram schematically showing an example of components included in the vehicle system.

Next, the components of the system will be described in detail. FIG. 2 is a block diagram schematically showing an example of the components of the vehicle system shown in FIG. 1. The vehicle system includes the vehicle platform 100, the automated-driving platform 200, and the communication interface 300, and the individual components are communicably connected through the dual bus including the main bus 400 and the sub-bus 401.

The vehicle platform 100 includes a vehicle control ECU 101, a braking device 102, a steering device 103, a steering angle sensor 111, and a speed sensor 112. Note that although the present example takes a vehicle with an engine as an example, a vehicle to be applied may be an electric vehicle. In such a case, the engine ECU can be replaced with an ECU that manages motive power of the vehicle. Note that the vehicle platform 100 may include other ECUs and sensors than those shown in FIG. 2.

The vehicle control ECU 101 is a computer that controls components included in the vehicle (for example, engine system components, power train system components, braking system components, electric system components, body system components, and the like). The vehicle control ECU 101 may be a set of a plurality of computers.

For example, the vehicle control ECU 101 controls engine speed by performing fuel injection control. The vehicle control ECU 101 can control the engine speed, for example, based on a control instruction (for example, an instruction specifying a throttle valve opening degree) generated by an operation (an accelerator operation or the like) made by an occupant.

When the vehicle is an electric vehicle, the vehicle control ECU 101 can control motor speed by controlling driving voltage or current, driving frequency, or the like. In such a case, as in the case of the vehicle using a prime mover as an engine, the motor speed can also be controlled based on a control instruction generated by an operation made by an occupant. In addition, regenerated current can be controlled based on a control instruction indicating a brake pedal force or a degree of regenerative braking. Note that when the vehicle is a hybrid vehicle, both control on an engine and control on a motor may be used.

Besides, the vehicle control ECU 101 can control braking force from a mechanical braking system by controlling an actuator 1021 included in the braking device 102, which will be described later. For example, the vehicle control ECU 101 controls brake fluid pressure by driving the actuator 1021 based on a control instruction (for example, an instruction indicating a brake pedal force) generated by an operation (a brake pedal operation or the like) made by an occupant.

The vehicle control ECU 101 can control a steering angle or an angle of a steering wheel by controlling a steering motor 1031 included in the steering device 103, which will be described later. The vehicle control ECU 101 controls the steering angle of the vehicle, for example, by driving the steering motor 1031 based on a control instruction (for example, an instruction indicating a steering angle) generated by an operation (a steering operation or the like) made by an occupant.

Note that the control instructions may be generated within the vehicle platform 100 based on operations made by an occupant, or may be externally generated outside the vehicle platform 100 (for example, by a device controlling automated-driving).

The braking device 102 is a mechanical braking system included in the vehicle. The braking device 102 includes an interface (a brake pedal or the like), the actuator 1021, a hydraulic system, a brake cylinder, and the like. The actuator 1021 is means for controlling fluid pressure in the braking system. The actuator 1021 that has received an instruction from the vehicle control ECU 101 controls the brake fluid pressure, whereby braking force from the mechanical braking system can be secured.

The steering device 103 is a steering system included in the vehicle. The steering device 103 includes an interface (a steering wheel or the like), the steering motor 1031, a gear box, a steering column, and the like. The steering motor 1031 is means for assisting steering operation. The steering motor 1031 that has received an instruction from the vehicle control ECU 101 is driven, whereby force required for steering operation can be reduced. By causing the steering motor 1031 to be driven, automatic steering operation that is not performed by an occupant can also be achieved.

The steering angle sensor 111 is a sensor that detects a steering angle obtained by steering operation. A detection value obtained by the steering angle sensor 111 is transmitted to the vehicle control ECU 101 at any time. Note that although a numeric value directly indicating a turning angle of a tire-wheel assembly is used for the steering angle in the embodiment, a value indirectly indicating a turning angle of the tire-wheel assembly may be used.

The speed sensor 112 is a sensor that detects a speed of the vehicle. A detection value obtained by the speed sensor 112 is transmitted to the vehicle control ECU 101 at any time.

Next, the automated-driving platform 200 will be described. The automated-driving platform 200 is a device that performs sensing of vehicle surroundings, generates a traveling-related schedule based on a result of the sensing, and issues an instruction to the vehicle platform 100 in accordance with the schedule. The automated-driving platform 200 may be developed by a manufacturer or a vendor different from a manufacturer or a vendor that develops the vehicle platform 100. Such the automated-driving platform 200 includes an automated-driving ECU 201 and sensors 202.

The automated-driving ECU 201 is a computer that performs automated-driving-related determination based on data acquired from the sensors 202, which will be described later, and controls the vehicle by communicating with the vehicle platform 100. The automated-driving ECU 201 is configured by using, for example, a CPU (central processing unit). The automated-driving ECU 201 includes two functional modules, namely, a state recognition section 2011 and an automated-driving control section 2012. Each functional module may be implemented by the CPU executing a program stored in storage means such as a ROM (read only memory).

The state recognition section 2011 detects an environment around the vehicle based on data acquired by a sensor included in the sensors 202, which will be described later. Examples of an object to be detected include, but are not limited to, the number and positions of lanes, the number and positions of vehicles existing around the own vehicle, the number and positions of obstacles (for example, pedestrians, bicycles, constructions, and buildings) existing around the own vehicle, a structure of a road, road signs, and the like. The object to be detected may be anything that is required for autonomous traveling. Data related to the environment (hereinafter, environmental data) detected by the state recognition section 2011 is transmitted to the automated-driving control section 2012, which will be described later.

The automated-driving control section 2012 controls traveling of the own vehicle by using the environmental data generated by the state recognition section 2011. For example, the automated-driving control section 2012 generates a traveling path for the own vehicle based on the environmental data, and determines acceleration-deceleration and steering angles of the vehicle such that the vehicle travels along the traveling path. The information determined by the automated-driving control section 2012 is transmitted to the vehicle platform 100 (vehicle control ECU 101) via the communication interface 300, which will be describe later. For a method of causing the vehicle to autonomously travel, a known method can be adopted.

In the embodiment, the automated-driving control section 2012 generates, as the first control instruction, only an instruction related to acceleration-deceleration of the vehicle and an instruction related to steering of the vehicle. Hereinafter, the instruction related to acceleration-deceleration of the vehicle will be referred to as an acceleration-deceleration instruction, and the instruction related to steering of the vehicle will be referred to as a steering instruction. The acceleration-deceleration instruction and the steering instruction are universal instructions that do not depend on a vehicle type or a manufacturer. In the embodiment, the acceleration-deceleration instruction is information specifying an acceleration-deceleration of the vehicle, and the steering instruction is information specifying a steering angle of the steering wheel included in the vehicle.

The sensors 202 are means for performing sensing of vehicle surroundings and typically include a monocular camera, a stereo camera, a radar, a LIDAR, a laser scanner, and the like. The sensors 202 may also include means for acquiring a current position of the vehicle (a GPS module or the like), in addition to the means for performing sensing of vehicle surroundings. Information acquired by any sensor included in the sensors 202 is transmitted to the automated-driving ECU 201 (state recognition section 2011) at any time.

Next, the communication interface 300 will be described. Control instructions handled by the vehicle control ECU 101 in the embodiment are particular to a vehicle and a manufacturer. On the other hand, the automated-driving platform 200 is a device developed by a third party and assumed to be mounted on various types of vehicles of various manufacturers. In other words, it is costly to connect both to a single in-vehicle network. Accordingly, in the embodiment, the communication interface 300 is used as a device that translates and relays data exchanged between the vehicle control ECU 101 and the automated-driving ECU 201.

Figure 3:
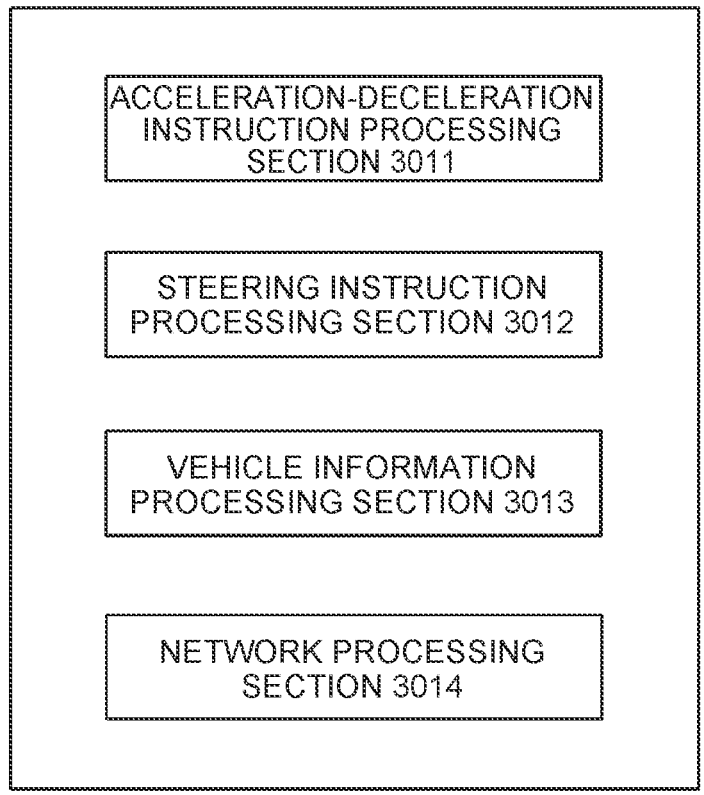
FIG. 3 is a block diagram showing a functional configuration of a control section in a communication interface.

A control section 301 is a computer that translates a control instruction handled by the automated-driving ECU 201 into a control instruction handled by the vehicle control ECU 101, and vice versa. The control section 301 is configured by using, for example, a CPU (central processing unit). As shown in FIG. 3, the control section 301 includes four functional modules, namely, an acceleration-deceleration instruction processing section 3011, a steering instruction processing section 3012, a vehicle information processing section 3013, and a network processing section 3014. Each functional module may be implemented by the CPU executing a program stored in a storage section 302, which will be described later.

The acceleration-deceleration instruction processing section 3011 receives an acceleration-deceleration instruction from the automated-driving ECU 201 and translates the acceleration-deceleration instruction into data (the second control instruction; hereinafter, control data) that can be interpreted by the vehicle control ECU 101. Specifically, an acceleration-deceleration (for example, +3.0 km/h/s) specified by the acceleration-deceleration instruction is translated into data indicating a throttle valve opening degree or data indicating a braking pressure. The control data after translation is transmitted according to a protocol or a format that is particular to the vehicle platform 100. Translation processing is performed by using translation information stored in the storage section 302, which will be described later. Note that although the throttle valve opening degree and the braking pressure are mentioned as examples of the control data in the present example, the control data may be any other data that is related to acceleration-deceleration of the vehicle. For example, the control data may be a target motor speed, a current value, or the like.

The steering instruction processing section 3012 receives a steering instruction from the automated-driving ECU 201 and translates the steering instruction into control data that can be interpreted by the vehicle control ECU 101 by using the translation information. Specifically, the steering instruction is translated into data indicating a steering angle that is particular to the vehicle platform 100. Note that although a turning angle of the tire-wheel assembly is mentioned as an example of the steering angle in the present example, the control data may be any other data that is related to steering of the vehicle. For example, the control data may be data that directly or indirectly indicates an angle of the steering wheel, a percentage of a maximum turning angle, or the like.

The vehicle information processing section 3013 receives information related to a state of the vehicle from the vehicle control ECU 101 and translates the information into information that can be interpreted by the automated-driving ECU 201 (information that is not particular to a vehicle type). Specifically, information transmitted according to the protocol or the format that is particular to the vehicle platform 100 is translated into information in a universal format (hereinafter, feedback data). Hereinafter, the information related to a state of the vehicle will be referred to as sensor data. The sensor data is, for example, data based on information acquired by the steering angle sensor 111 and the speed sensor 112 and is transmitted to the in-vehicle network by the vehicle control ECU 101. The sensor data may be any data that can be fed back to the automated-driving ECU 201, such as speed information, information related to a turning angle of the tire-wheel assembly, and information related to a steering angle. In the embodiment, the vehicle information processing section 3013 translates sensor data related to a current speed and a state of a steering angle.

The network processing section 3014 switches between the main bus 400 and the sub-bus 401. In the vehicle system according to the embodiment, the individual components of the vehicle platform 100, the automated-driving platform 200, and the communication interface 300 are connected through the dual bus including the main bus 400 and the sub-bus 401, as mentioned above. The main bus 400 and the sub-bus 401 include, for example, communication lines that transmit a differential signal based on a CAN (controller area network) protocol, and electrode wires that supply electricity for each component to generate the differential signal. The electrode wire of the main bus 400 is connected to the main power supply 500, and the electrode wire of the sub-bus 401 is connected to the sub-power supply 501. Selected by the network processing section 3014 is which one of the main bus 400 and the sub-bus 401 is used to perform communication among the individual components. In other words, the network processing section 3014 switches between communication using the main bus 400 and communication using the sub-bus 401 by switching on/off the main power supply 500 and the sub-power supply 501. In the present example, when the main power supply 500 is operating normally, communication among the individual components is performed, as a rule, by using the main bus 400 by turning on the main power supply 500 and turning off the sub-power supply 501. When an abnormality occurs in the main power supply 500, communication among the individual components is performed by using the sub-bus 401 by turning off the main power supply 500 and turning on the sub-power supply 501.

Figures 4, 5:
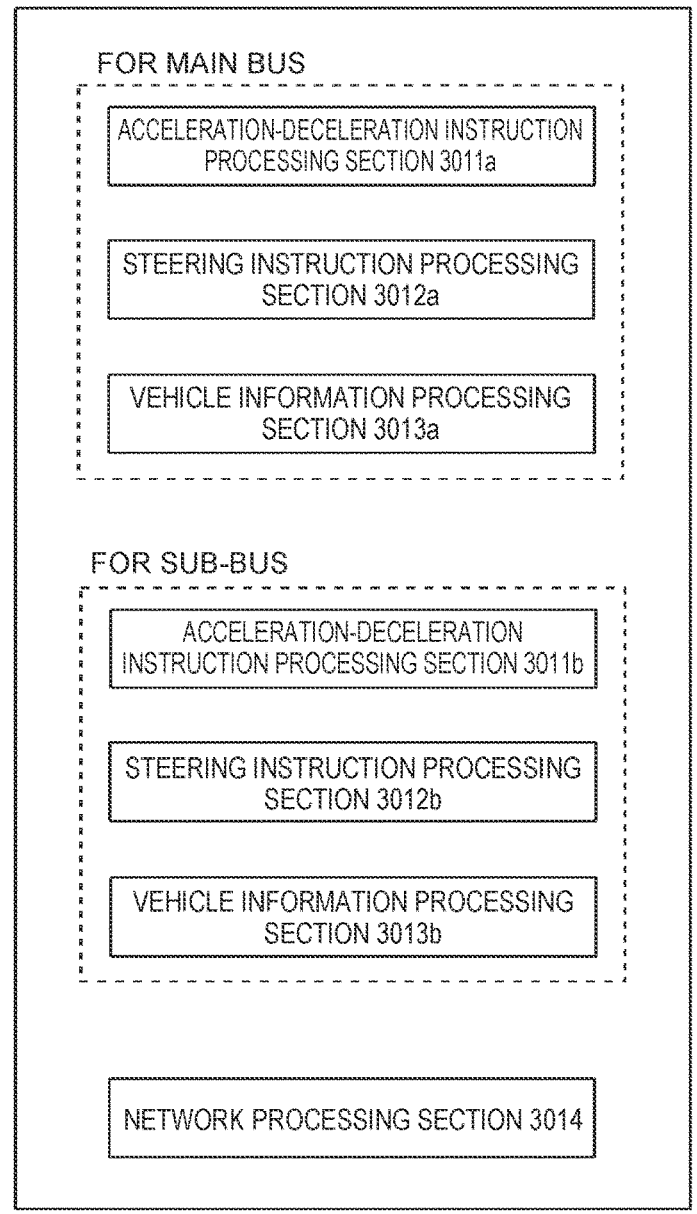
FIG. 4 is a block diagram showing another example of the functional configuration of the control section in the communication interface.
FIG. 5 shows data to be translated.

Note that although the acceleration-deceleration instruction processing section 3011, the steering instruction processing section 3012, and the vehicle information processing section 3013 are configured by using functional modules in a single system in the example shown in FIG. 3, a dual system may be configured by including functional modules for the main bus 400 (an acceleration-deceleration instruction processing section 3011*a*, a steering instruction processing section 3012*a*, a vehicle information processing section 3013*a*) and functional modules for the sub-bus 401 (an acceleration-deceleration instruction processing section 3011*b*, a steering instruction processing section 3012*b*, a vehicle information processing section 3013*b*) as shown in FIG. 4. In other words, in the communication interface 300, the functional modules that translate and relay data exchanged between the vehicle control ECU 101 and the automated-driving ECU 201 may be configured as a dual system including systems for the main bus 400 and for the sub-bus 401. Thus, the functional modules for the main bus 400 and the functional modules for the sub-bus 401 can also be implemented by a single computer.

The storage section 302 is means for storing information and is configured by using a storage medium such as a RAM, a magnetic disk, or a flash memory. In the storage section 302, the information for translating the acceleration-deceleration instruction and the steering instruction generated by the automated-driving ECU 201 (automated-driving control section 2012) into the control data that can be interpreted by the vehicle control ECU 101 (hereinafter, translation information) is stored. The translation information further includes information for translating the sensor data that is particular to the vehicle into the feedback data.

The translation information includes, for example, configuration of the control data input into the vehicle control ECU 101 or output from the vehicle control ECU 101, parameters of the control, and a table or expressions for translating the input values into the parameters. Moreover, the translation information includes configuration of the sensor data output from the vehicle control ECU 101, parameters in the sensor data, and a table or expressions for translating the parameters into physical values.

FIG. 5 shows types of data to be translated based on the translation information. In FIG. 5, "Input" indicates that data comes from the automated-driving ECU 201 and is destined for the vehicle control ECU 101, and "Output" indicates that data comes from the vehicle control ECU 101 and is destined for the automated-driving ECU 201. As described above, instructions about an acceleration-deceleration and a steering angle are transmitted from the automated-driving ECU 201 to the vehicle control ECU 101, and data about a current speed and a state of a steering angle is transmitted from the vehicle control ECU 101 to the automated-driving ECU 201. When other data than the data shown in FIG. 5 is transmitted to the communication interface 300, the other data is discarded.

In the vehicle system according to the embodiment, with the configuration described above, communication between the vehicle platform 100 and the automated-driving platform 200 is performed.

Flow of Processing

Next, processing performed by the communication interface 300 in the vehicle system according to the embodiment will be described with reference to FIGS. 6 and 7 that are processing flowcharts. The processing shown in FIGS. 6, 7 is performed by the communication interface 300 at a predetermined cycle.

Figure 6:
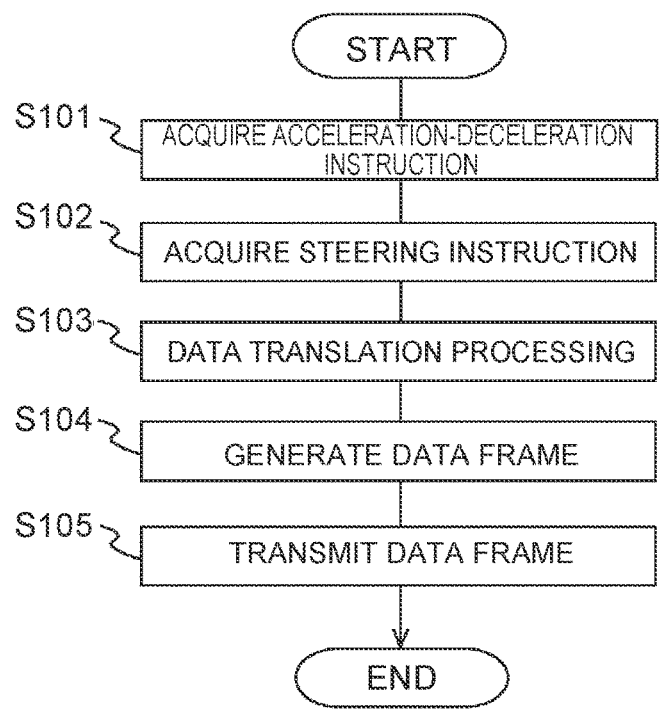
FIG. 6 is a first flowchart showing a flow of processing performed by the communication interface in the embodiment.
Figure 7:
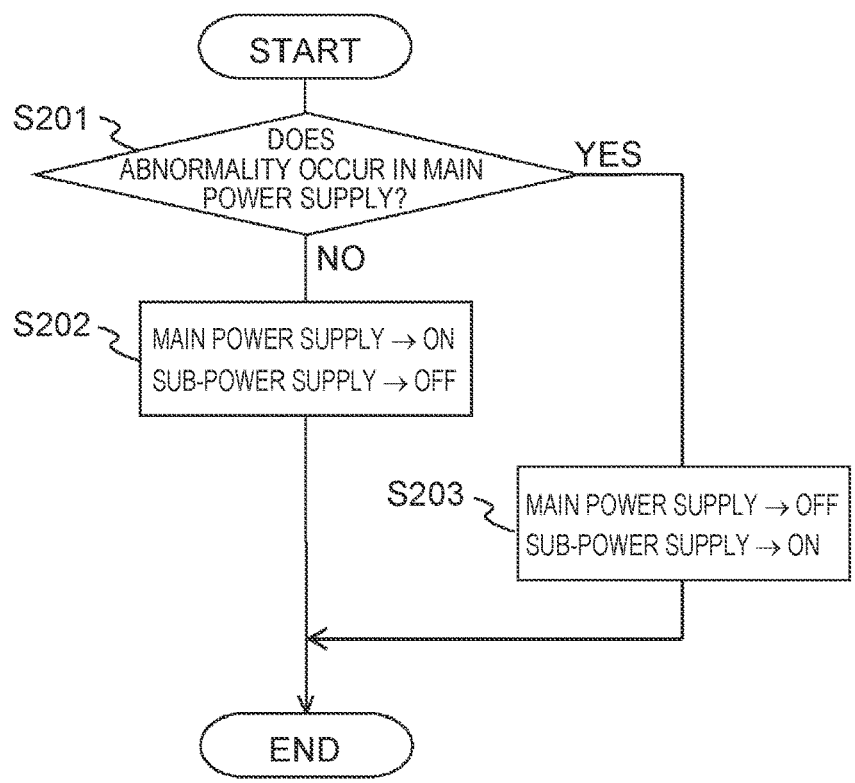
FIG. 7 is a second flowchart showing a flow of processing performed by the communication interface in the embodiment.

First, referring to FIG. 6, the acceleration-deceleration instruction processing section 3011 of the communication interface 300 acquires an acceleration-deceleration instruction transmitted from the automated-driving ECU 201 (step S101). Similarly, the steering instruction processing section 3012 of the communication interface 300 acquires a steering instruction transmitted from the automated-driving ECU 201 (step S102).

In step S103, the acceleration-deceleration instruction processing section 3011 and the steering instruction processing section 3012 performs data translation processing. Specifically, the acceleration-deceleration instruction processing section 3011 translates the acceleration-deceleration instruction into control data, based on the translation information stored in the storage section 302. The control data that is a translation destination is data indicating a throttle valve opening degree or data indicating a braking pressure. The steering instruction processing section 3012 translates the steering instruction into control data, based on the translation information stored in the storage section 302. The control data that is a translation destination is data indicating a steering angle (a turning angle of the tire-wheel assembly).

In step S104, the control section 301 encapsulates the control data generated in step S103 in a data frame that is transmittable over the main bus 400 (or the sub-bus 401). Subsequently, in step S105, the control section 301 transmits the data frame generated in step S104 to the vehicle control ECU 101 as a destination. Note that when the communication interface 300 receives data other than the data shown in FIG. 5 from the automated-driving platform 200, filtering to discard such other data is performed.

Next, referring to FIG. 7, the network processing section 3014 of the communication interface 300 determines whether or not an abnormality occurs in the main power supply 500 (step S201). "An abnormality in the main power supply 500" here is, for example, a failure of the main power supply 500, a disconnection of an electrode wire included in the main bus 400, or the like. For a method of detecting such an abnormality, a known method can be adopted.

Here, when the main power supply 500 is operating normally (negative determination in step S201), the network processing section 3014 turns on the main power supply 500 and turns off the sub-power supply 501 (step S202). In such a case, communication among the individual components of the vehicle platform 100, the automated-driving platform 200, and the communication interface 300 is performed by using the main bus 400.

When an abnormality occurs in the main power supply 500 (positive determination in step S201), the network processing section 3014 turns off the main power supply 500 and turns on the sub-power supply 501 (step S203).

In the vehicle system according to the embodiment, even in a state where communication using the main bus 400 cannot be performed due to an abnormality in the main power supply 500, communication can be performed by using the sub-bus 401 that operates based on the sub-power supply 501 that is different from the main power supply 500. In other words, even in a state where data propagation between the vehicle platform 100 and the automated-driving platform 200 using the main bus 400 is impossible, data propagation between the vehicle platform 100 and the automated-driving platform 200 can be performed by using the sub-bus 401. As a result, even in a state where the main bus 400 cannot be used due to an abnormality or the like in the main power supply 500, it is possible to cause the vehicle to properly travel. Accordingly, the highly reliable vehicle system can be provided.

In the vehicle system according to the embodiment, data relayed by the communication interface 300 is narrowed down to an instruction related to acceleration-deceleration and an instruction related to steering and other instructions are filtered out, whereby it is possible to prevent unnecessary access to the vehicle functions and to ensure safety. Moreover, only by preparing the translation information, it is possible to apply the same automated-driving platform 200 to various vehicle types. Accordingly, versatility of the automated-driving platform 200 can be enhanced while security of the vehicle platform 100 is ensured.

Other Embodiments

In the above-described embodiment, an example is described in which the communication interface includes the function of translating and relaying data exchanged between the vehicle control ECU and the automated-driving ECU, in addition to the function of switching between communication using the main bus 400 and communication using the sub-bus 401. However, the communication interface may be configured to only include the function of switching between communication using the main bus 400 and communication using the sub-bus 401. In other words, when the automated-driving ECU is configured to be capable of generating data that can be interpreted by the vehicle control ECU, the communication interface may be configured to only include the function of switching between communication using the main bus 400 and communication using the sub-bus 401.

Modifications

The embodiments described above are only examples, and changes can be made as appropriate to work the disclosure without departing from the scope of the disclosure. For example, the processing and the means described in the disclosure can be freely combined and implemented to the extent that no technical inconsistency arises.

The processing described as being performed by a single device may be performed by a plurality of devices in a divided manner. Alternatively, the processing described as being performed by different devices may be performed by a single device. In the computer system, what hardware component or components (server component or components) are used to implement each function can be flexibly changed.

The disclosure can also be implemented by providing a computer program in which the functions described in the embodiments are implemented to a computer, and by one or more processors included in the computer reading and executing the program. Such a computer program may be provided to the computer by using a non-transient computer-readable storage medium that can connect to a system bus of the computer, or may be provided to the computer via a network. Examples of the non-transient computer-readable storage medium include any types of disks and discs such as magnetic disks (floppy (registered trademark) disk, hard disk drive, and the like) and optical discs (CD-ROM, DVD disc, Blu-ray disc, and the like), read-only memory (ROM), random access memory (RAM), EPROM, EEPROM, magnetic card, flash memory, optical card, and any types of media suitable for storing electronic instructions.

What is claimed is:

1. A vehicle system comprising:
   a vehicle platform including a first computer that is configured to control traveling of a vehicle, the vehicle platform also including a steering device and a steering angle sensor;
   an automated-driving platform including a second computer that is configured to control automated-driving of the vehicle, the automated-driving platform also including sensors;
   a first network connecting the vehicle platform and the automated-driving platform and by which the vehicle platform and the automated-driving platform can communicate with each other;
   a second network connecting the vehicle platform and the automated-driving platform and by which the vehicle platform and the automated-driving platform can communicate with each other;
   a main power supply that is configured to supply electricity required for communication in the first network;
   a sub-power supply that is configured to supply electricity required for communication in the second network; and
   a communication interface that is configured to allow communication of information between the vehicle platform and the automated-driving platform to be performed by using any one of the first network and the second network, wherein
   the communication interface is configured to determine whether the communication between the vehicle platform and the automated-driving platform can be performed using the first network,
   the communication interface is further configured to: acquire a steering instruction from the second computer as a first control instruction including data for controlling the vehicle platform; translate the steering instruction into data indicating a turning angle of a tire-wheel assembly of the vehicle as a second control instruction for the first computer; and transmit the second control instruction to the first computer,
   the first control instruction is data that is not particular to the first computer included in the vehicle, and
   the second control instruction is data that is particular to the first computer.

2. The vehicle system according to claim 1, wherein
   the communication interface is configured to determine whether the communication between the vehicle platform and the automated-driving platform can be performed using the first network by determining whether the main power supply is operating normally, and
   the communication interface is configured to: allow the communication between the vehicle platform and the automated-driving platform to be performed by using the first network when the communication interface determines that the main power supply is operating normally; and allow the communication between the vehicle platform and the automated-driving platform to be performed by using the second network when the communication interface determines that an abnormality occurs in the main power supply.

3. The vehicle system according to claim 1, wherein the communication interface is configured to determine whether the communication between the vehicle platform and the automated-driving platform can be performed using the first network by determining whether the main power supply is operating normally.

4. The vehicle system according to claim 1, wherein:
   the first network includes a main bus connected to the main power supply, the vehicle platform, the automated-driving platform and the communication interface, and
   the communication interface is configured to determine whether the communication between the vehicle platform and the automated-driving platform can be performed using the first network by determining whether the communication is possible using the main bus.

5. The vehicle system according to claim 1, wherein:
   the vehicle platform also includes a braking device and a speed sensor; and
   the communication interface is configured to: further acquire an acceleration-deceleration instruction as the first control instruction; and discard an instruction other than the acceleration-deceleration instruction and the steering instruction when the first control instruction includes the instruction other than the acceleration-deceleration instruction and the steering instruction.

6. The vehicle system according to claim 1, wherein:
   the vehicle platform also includes a braking device and a speed sensor; and
   the communication interface is configured to (i) further acquire an acceleration-deceleration instruction specifying an acceleration-deceleration from the second computer as the first control instruction, and (ii) translate the acceleration-deceleration that has been specified into data indicating a throttle valve opening degree or data indicating a braking pressure as the second control instruction.

7. A vehicle system comprising:
a vehicle platform including a first computer that is configured to control traveling of a vehicle, the vehicle platform also including a braking device, a steering device, a steering angle sensor, and a speed sensor;
an automated-driving platform including a second computer that is configured to control automated-driving of the vehicle, the automated-driving platform also including sensors;
a first network connecting the vehicle platform and the automated-driving platform and by which the vehicle platform and the automated-driving platform can communicate with each other;
a second network connecting the vehicle platform and the automated-driving platform and by which the vehicle platform and the automated-driving platform can communicate with each other;
a main power supply that is configured to supply electricity required for communication in the first network;
a sub-power supply that is configured to supply electricity required for communication in the second network; and
a communication interface that is configured to allow communication of information between the vehicle platform and the automated-driving platform to be performed by using any one of the first network and the second network, wherein the communication interface is configured to determine whether the communication between the vehicle platform and the automated-driving platform can be performed using the first network, the communication interface is further configured to: acquire a first control instruction including data for controlling the vehicle platform from the second computer; translate the first control instruction into a second control instruction for the first computer; and transmit the second control instruction to the first computer, the first control instruction includes at least one of an acceleration deceleration instruction and a steering instruction, the communication interface is configured to discard an instruction other than the acceleration-deceleration instruction and the steering instruction when the first control instruction includes the instruction other than the acceleration-deceleration instruction and the steering instruction, the first control instruction is data that is not particular to the first computer included in the vehicle, and the second control instruction is data that is particular to the first computer.

* * * * *